United States Patent [19]

Green et al.

[11] 3,774,443
[45] Nov. 27, 1973

[54] ACOUSTIC EMISSION DAMAGE MEASUREMENT
[75] Inventors: Allen T. Green, Walnut Creek; Alan S. Tetelman, Larkspur, both of Calif.
[73] Assignee: Becton, Dickinson Electronics Company, Rutherford, N.J.
[22] Filed: June 19, 1972
[21] Appl. No.: 264,161

[52] U.S. Cl. ................... 73/67.3, 73/88 R, 181/0.5
[51] Int. Cl. ............................................. G01n 29/00
[58] Field of Search .......................... 73/67.3, 88 R; 181/.5

[56] References Cited
FOREIGN PATENTS OR APPLICATIONS
852,771    2/1950   Germany Primary Examiner—Richard C. Queisser
Assistant Examiner—Arthur E. Korkosz
Attorney—Alvin E. Hendricson et al.

[57] ABSTRACT

A precracked gage element is attached to a structural member to be monitored for damage and is continuously or periodically monitored to determine acoustic emission therefrom as a measure of fatigue damage of a structural member.

3 Claims, 5 Drawing Figures

PATENTED NOV 27 1973 3,774,443

ACOUSTIC EMISSION DAMAGE MEASUREMENT

BACKGROUND OF INVENTION

The problems of progressive failure of structural members such as beams or the like has received relatively wide-spread attention. Progressive failure may occur from a variety of causes such as, for example, periodic or cyclic loading which causes fatigue of the members that may ultimately result in cracking and failure. Such loading may be of a relatively minor nature; however, the cumulative effect thereof may yet cause failure.

There have been developed methods of nondestructive testing of structural members; however, these are generally quite expensive and time consuming. It is not generally practical with accepted methods of testing to employ conventional testing methods with any degree of frequency and yet this then allows possible failure of structural elements without adequate warning. It would undoubtedly be advantageous to be able to visibly observe progressive damage or weakening of structural elements sufficiently in advance of any failure thereof to take adequate precautions such as replacement of a member or the like. Unfortunately fatigue damage is not normally readily visible. In this respect there have been developed and employed notched metal gages adapted to attachment to structural members and designed to fail prior to such members. This type of gage is primarily useful as an indicator of major stresses of the type that might individually rupture or damage a structural element. At best this type of gage provides a relatively crude indication or possible structural failure.

The present invention provides for accurate and simple monitoring of fatigue damage of members by employing the phenomenon of acoustic emission.

SUMMARY OF INVENTION

The present invention employs the phenomenon of acoustic emission of materials under stress. It has been discovered that materials under stress produce acoustic emission and, furthermore, that this effect is irreversible. Thus, a piece of metal, for example, will emit high frequency noice or sounds as a force is applied thereto but will not again produce acoustic emission until a subsequently applied stress exceeds the actual stress or until a new stress distribution is created such as by the introduction of a fatigue crack. In this respect attention is invited to German Pat. No. 852,771 to J. Kaiser and it is noted that this particular acoustic emission phenomenon of materials is sometimes termed the "Kaiser effect."

Considering somewhat further the Kaiser effect, it is noted that acoustic emission is the result of applied stress and the irreversibility of the effect is related to the stress. It has been established as a fact that the extent of damage can be related to the acoustic emission. Measure of the damage in the gage is then a measure of the damage in the structural member.

The present invention provides for precracking or notching the gage element which is then attached to the structural member to be monitored for damage, such as fatigue damage, for example. The material of the gage element, its physical size, dimensions, and crack dimensions are determined by the structural member and its service environment. In particular it is predetermined that stress applied to the structural member at the point of attachment shall be likewise applied to the gage element. Furthermore, the invention provides that there will be progressive damage to the gage element before the structural member fails. With the notching or precracking of the gage element there will then be produced by successive stresses thereof some further cracking of the element, even though such cracking may not be visible to the naked eye.

The gage element is periodically checked for acoustic emission by the application of an increasing measured force or pressure to the element and a continuous monitoring of the element for acoustic emission to determine the degree of force or the like required to produce acoustic emission. This same force or the like is simultaneously causing damage to the member. Whatever the original force that may be applied to the gage element, subsequent further damage of the element as a result of fatigue will cause acoustic emission to occur at a lower force applied under the same circumstances as before. This then provides a measure of fatigue of the gage element which may be then related to fatigue of the structural member to which it is normally attached.

DESCRIPTION OF FIGURES

The present invention is illustrated as to particular preferred embodiments thereof in the accompanying drawings wherein.

DESCRIPTION OF PREFERRED EMBODIMENTS

Figure 1:
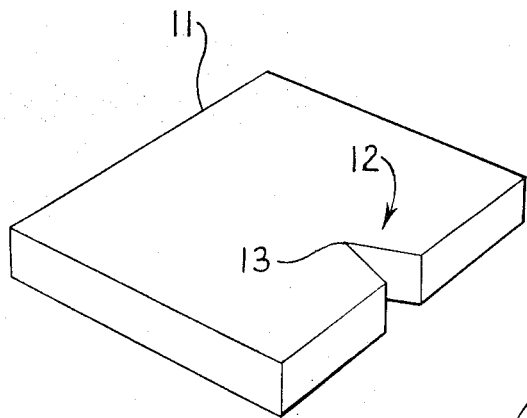
FIG. 1 is a perspective view of a damage gage in accordance with the present invention.

A gage in accordance with the present invention may be embodied as a small flat piece of metal 11, as illustrated in FIG. 1. This plate 11 may have a rectangular configuration, as illustrated, and is provided with a laterally extending notch 12 in one side thereof. This notch is V-shaped, as illustrated, and tapers to a point 13 directed toward the opposite side of the plate. The notch 12 in the plate serves to "precrack" the plate in order to provide a point of stress concentration for loads applied to the plate. The configuration of the notch may be varied; however, the notch does terminate at a very narrow cross section such as the point 13.

Figure 2:
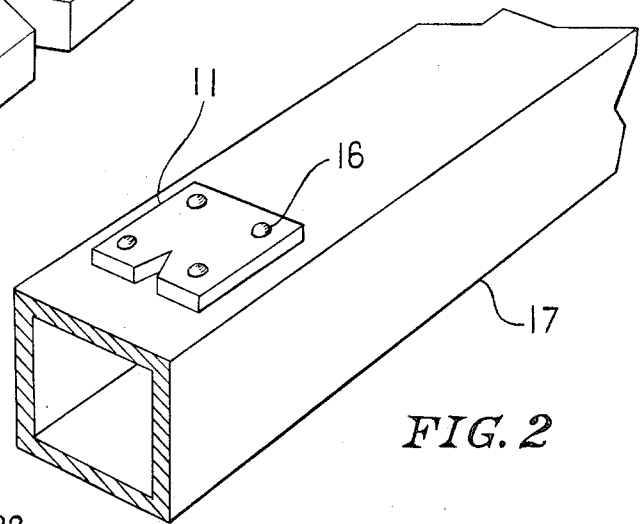
FIG. 2 is a perspective illustration of the damage gage of FIG. 1 mounted upon a structural member in the form of a boxed beam.
Figure 4:
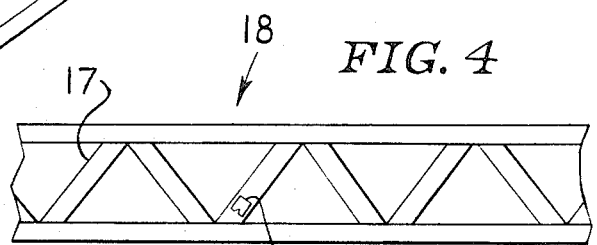
FIG. 4 is a partial elevational view of a truss structure upon which the damage gage hereof may be mounted for monitoring fatigue stress of an element thereof.

Further with regard to the gage plate 11 of the present invention, it is noted that the material and physical dimensions thereof are predetermined for particular applications. In accordance with the present invention the gage plate 11 is adapted to be securely mounted upon an element to be monitored for fatigue stress. This is generally illustrated in FIG. 2 wherein the gage plate 11 is shown to be secured as by bolts or the like 16 to a box beam 17. Such a beam 17 may, for example, comprise a structural element of a bridge truss 18, as illustrated in FIG. 4. With a prior knowledge of the general characteristics of the beam 17, for example, the gage plate is dimensioned of predetermined material so as to ensure failure of the gage prior to failure of the beam.

Figure 3:
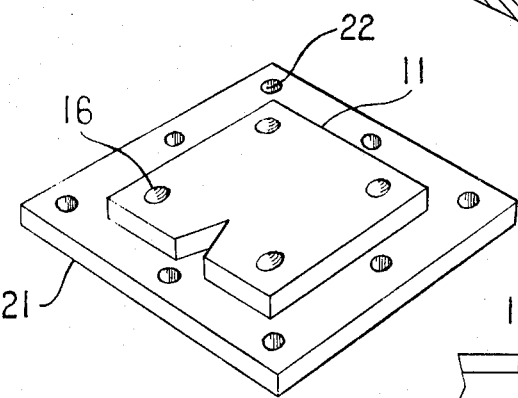
FIG. 3 illustrates in perspective a damage gage in accordance with the present invention upon a mounting plate.

Additional provision may be made for mounting of the gage, such as illustrated in FIG. 3 wherein it is shown that the gage plate 11 is secured as by bolts 16 to a carrier 21 having a plurality of bolt or rivet holes 22 therethrough for attachment to a structural member to be monitored for stress.

Figure 5:
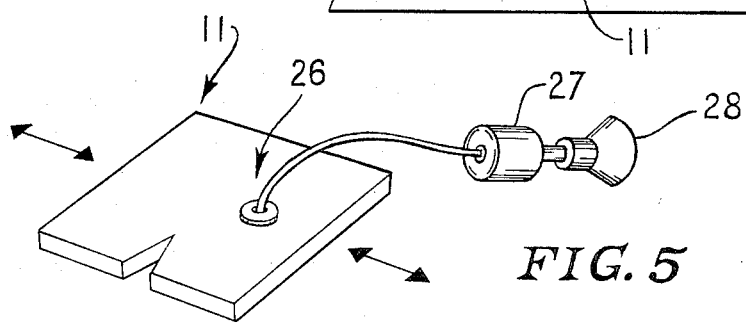
FIG. 5 is a schematic illustration of acoustic emission monitoring of the damage gage hereof.

The monitoring process of the present invention preferably provides for initial determination of the stress necessarily applied to the gage plate 11 to produce acoustic emission from the gage plate. This is schematically illustrated in FIG. 5 wherein the gage plate or element 11 is schematically shown to have an increasing force applied thereto with an acoustic emission detector 26 attached to the gage element. The acoustic emission detector may, for example, comprise a piezoelectric crystal or the like connected through an amplifier 27 to an audio output device 28.

The present invention, as briefly noted above, employs the Kaiser effect. This effect, briefly stated, comprises the acoustic emission by materials under stress. The effect is irreversible such that subsequent application of a lesser stress to an element than was previously applied will not produce acoustic emission. Although it might appear that this effect would be of little use in determining fatigue damage, such is not the case.

In accordance herewith a gage element or plate properly dimensioned and formed of appropriate material is attached to a structural member to be monitored for fatigue damage. Cyclic loading of the structural member will produce progressive fatigue damage to the member; however, difficulty is normally encountered in determining the extent of such damage sufficiently in advance of fatigue failure. With the gage plate attached to the cyclicly loaded structural member, the gage plate also experiences cyclic loading with consequent fatigue damage. The notched configuration of the gage plate provides for concentration of stresses at the point 13 of the notch to thereby cause a concentration of fatigue damage thereat. Although this damage is normally not visible to the naked eye, there does result at least a minute physical change in the gage plate at the point of the notch. This physical change then alters the area upon which the fatigue loading occurs.

As noted above, stress is proportional to force or load divided by area over which same is applied. The area of load application incrementally decreases with fatigue growth of the notch in the gage plate and thus it will be seen that less force is required to produce the same stress. In accordance with the present invention, the gage plate or element is periodically checked to determine the force necessarily applied thereto to produce acoustic emission. In practice the gage element or plate 11 is at least periodically tested by subjecting the plate to an increasing force of continuously measured magnitude while monitoring the gage plate or element for acoustic emission. Provision is made for determining the applied force at the initiation of acoustic emission. This applied force is then compared to the original force necessary to produce acoustic emission and the difference between these forces is a measure of the fatigue damage of the gage plate or element. With the gage plate or element properly dimensioned and formed of appropriate material, the fatigue damage of the gage plate is directly related to the fatigue damage of the structural member to which the gage is attached. There is consequently provided by the present invention a method for monitoring fatigue damage of structural members.

In the practice the present invention is normally employed by testing the gage plates thereof at some predetermined intervals; however, it is possible to provide substantially continuous monitoring in critical situations. Normally the gage plate is physically removed from the member being monitored in order to test the gage for fatigue damage. The application of a measured increasing force to the gage plate may be accomplished in a variety of ways as, for example, by clamping the top and bottom of the plate in movable jaws drawn apart by hydraulic pressure. Acoustic emission detectors are known in the art and it is noted that a test fixture for gage plates of the present invention may incorporate an automatic plotting chart wherein applied force is plotted versus acoustic emission with provision being made for terminating the application of increasing force immediately upon detection of acoustic emission. Care should be taken not to damage the plate itself during testing for acoustic emission.

With regard to the gage plate or element 11 of the present invention, it is noted that the notch therein provides for controlling the location of plate failure of the gage and also provides an insurance that the gage plate will fail before the structural member to which it is attached. Even though the application of cyclic loading to the plate attached to a structural member may produce no visible damage to the gage plate, there does occur a fatigue crack growth at the point of the notch in the plate to minutely lengthen the notch. This crack growth may only comprise molecular displacement and yet this is sufficient for the present invention. It may be considered that the present invention provides for measurement of a "stress intensity factor" which may be defined as resistance of a material to crack growth. At a critical stress intensity factor a crack theoretically continues to propagate under the same or lesser stress than previously applied. By measurement or fatigue damage in accordance with the present invention information is provided as to the stress intensity factor of structural members so as to preclude the possibility of such member reaching a critical stress intensity factor.

There is provided by the present invention method and means for measuring fatigue damage to structural members in a simple and inexpensive manner. Substantially all types of structural members may be monitored for fatigue damage in accordance with the present invention. It will be apparent to those skilled in the art that variations and modifications of the present invention may be made within the scope thereof and thus it is not intended to limit the invention by the details of description or illustration.

What is claimed is:

1. A method of measuring fatigue damage of a structural member comprising the steps of forming an indentation in an edge of a flat piece of gage material, attaching said piece of gage material to a structural member, and at least periodically monitoring said piece of gage material for acoustic emission while applying an increasing force to the piece and measuring the applied force at initiation of acoustic emission, whereby the difference in said measured force and initial known force is a measure of fatigue damage of said structural member.

2. The method of claim 1 further defined by initially stressing said piece of gage material a predetermined amount by applying a known force thereto whereby said material does not produce acoustic emission at stresses less than said initial stress.

3. The method of claim 1 further defined by forming the indentation in the edge of said piece of gage material with a pointed inner end to thus concentrate stress at such point whereby the repeated application of forces to the piece of gage material attached to the structural member causes minute cracking at the point of the indentation to thus change the stress concentration thereat with similar force application so that acoustic emission occurs at a lower force than the initial known force.

* * * * *